No. 844,805. PATENTED FEB. 19, 1907.
G. G. HOWE.
DRIVE CHAIN.
APPLICATION FILED NOV. 13, 1905.
2 SHEETS—SHEET 1.
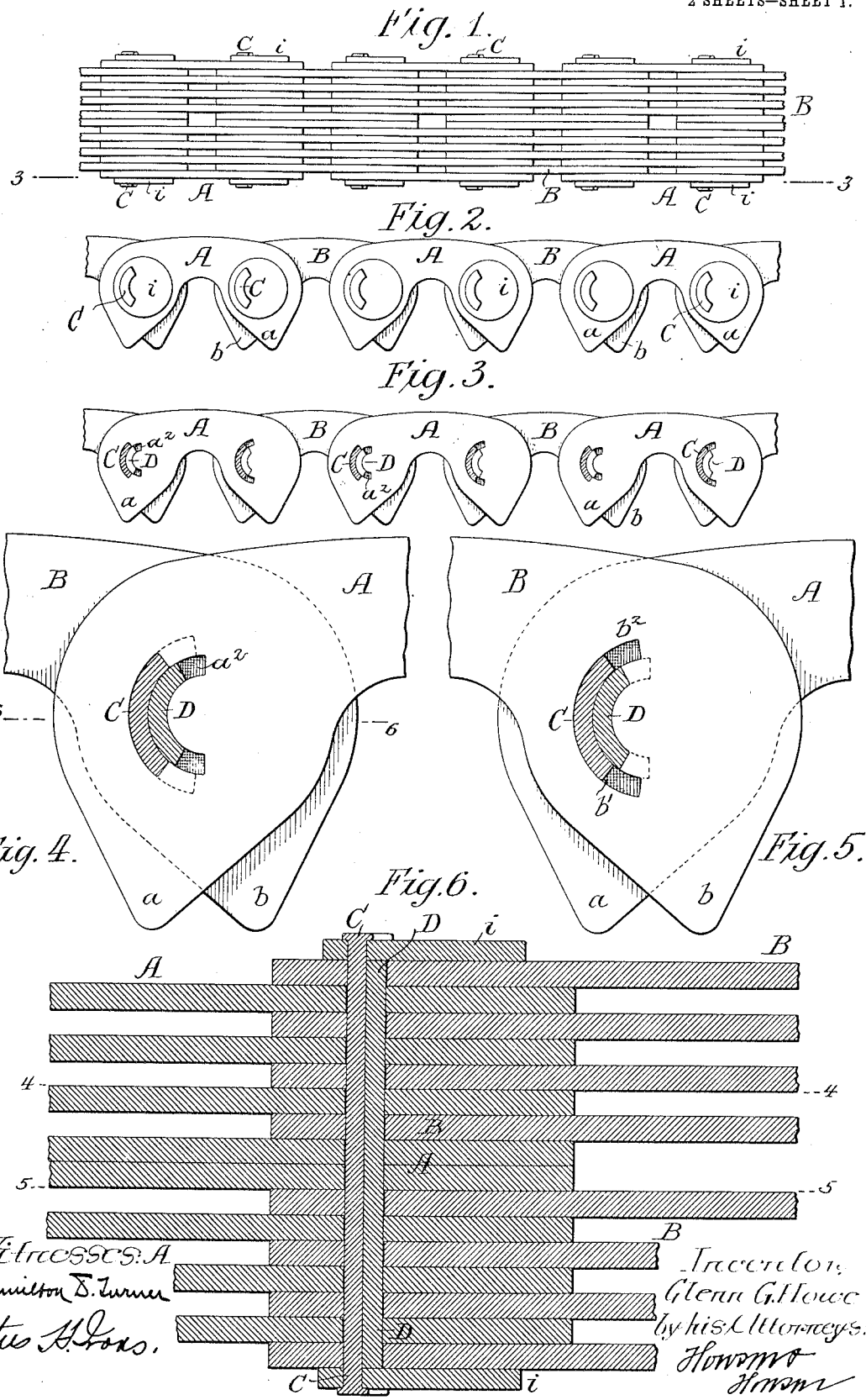

No. 844,805. PATENTED FEB. 19, 1907.
G. G. HOWE.
DRIVE CHAIN.
APPLICATION FILED NOV. 13, 1905.

2 SHEETS—SHEET 2.

Witnesses:

Inventor:
Glenn G. Howe.
by his Attorneys

UNITED STATES PATENT OFFICE.

GLENN G. HOWE, OF INDIANAPOLIS, INDIANA.

DRIVE-CHAIN.

No. 844,805.  Specification of Letters Patent.  Patented Feb. 19, 1907.

Application filed November 13, 1905. Serial No. 287,079.

*To all whom it may concern:*

Be it known that I, GLENN G. HOWE, citizen of the United States, residing at Indianapolis, Indiana, have invented certain Improvements in Drive-Chains, of which the following is a specification.

My invention relates to certain improvements in drive-chains, particularly those which have teeth or projections which engage the teeth of a sprocket-wheel and commonly known as "noiseless" chains.

The object of my invention is to dispense with the usual cylindrical pivot-pin and provide means by which one set of link elements is connected to another by two transverse segmental plates, one plate sliding upon another when the chain is articulated. This object I attain in the following manner, reference being had to the accompanying drawings, in which—

Figure 8:
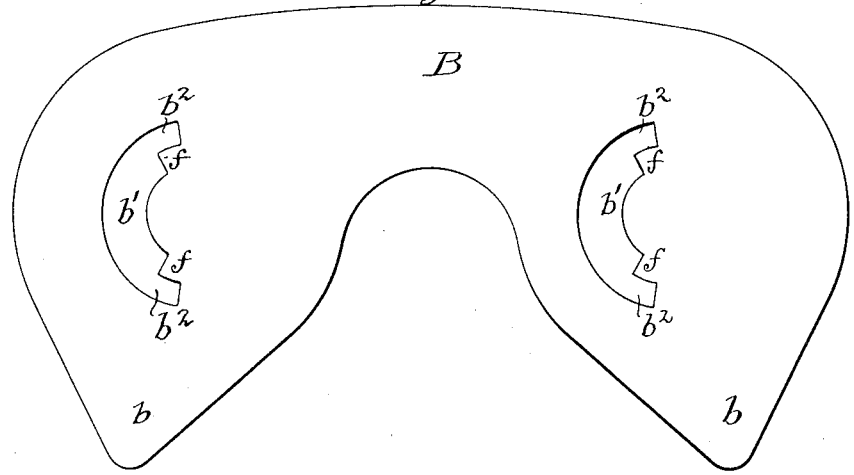
Figure 7:
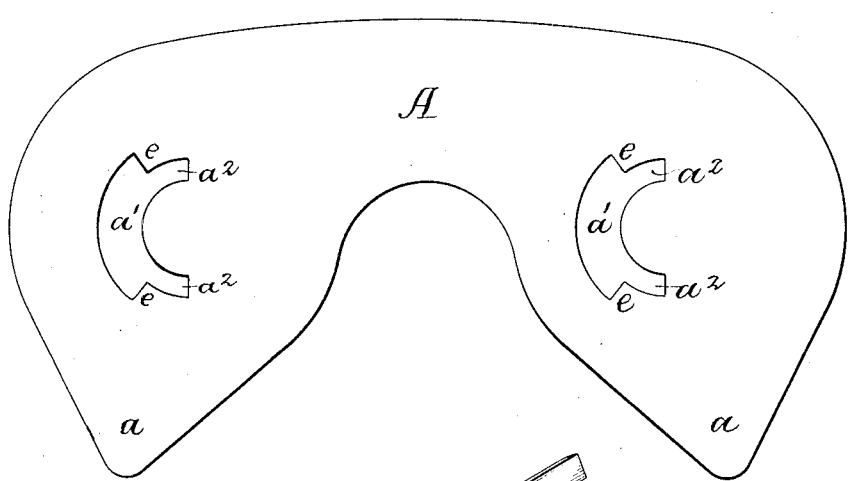
Figure 9:
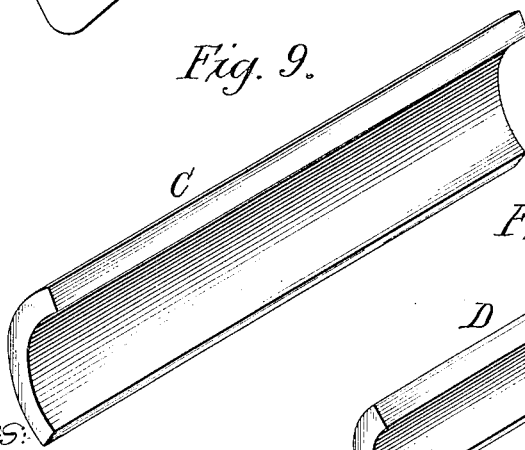
Figure 10:
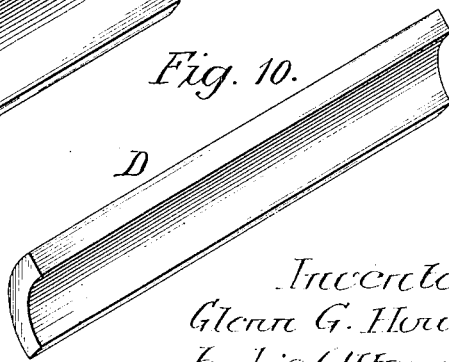

Figure 1 is a plan view of my improved chain. Fig. 2 is a side view. Fig. 3 is a sectional view on the line 3 3, Fig. 1. Fig. 4 is a sectional view on the line 4 4, Fig. 6. Fig. 5 is a sectional view on the line 5 5, Fig. 6. Fig. 6 is a sectional view on the line 6 6, Fig. 4. Fig. 7 is a side view of one of the link elements. Fig. 8 is a side view of one of the other link elements, and Figs. 9 and 10 are perspective views of the segmental connecting-plates.

There are two sets of link elements A and B, which alternate with each other in making up the chain. These link elements are connected together by the bearing-plates C and D. Each bearing-plate is made in the form of a segment of a cylindrical shell, the plate C being curved to a greater radius than the plate D, and the convex surface of the plate D snugly fits and slides upon the concaved surface of the plate C. The link elements A are shaped as shown in Fig. 8, having projecting teeth $a$ $a$, which are arranged to engage the teeth of a sprocket-wheel, and in each end of each link element is a segmental slot $a'$, stepped, as shown, so as to form shoulders $e$ $e$, between which rests the segmental bearing-plate C, thus firmly locking the bearing-plate to the series of link elements A, so that the bearing-plate must always turn with the link elements A. The slots $a'$ are of sufficient width to receive both the bearing-plate C and the bearing-plate D, and the slot is extended, as at $a^2$, so as to allow the bearing-plate D, which is attached to the link elements B, to turn freely and independently of the link elements A. The link elements B are made as clearly shown in Fig. 7, having teeth $b$, similar to the teeth $a$ of the link elements A, and a segmental slot $b'$ at each end of a width to receive both the plates C and D. The slot is stepped, so as to form shoulders $f$, between which fits the bearing-plate D, so that it will turn with the link elements, and each slot is extended at $b^2$ to allow for freedom of motion of the bearing-plate C. Both bearing-plates C and D extend throughout the entire width of the chain, as shown in Fig. 6, and the bearing-plate C in the present instance extends through washers $i$ at each side of the chain, and the ends of the plates are riveted down upon the washers so that the link elements will be permanently coupled and held against lateral displacement. It will be seen by this construction that instead of the several link elements bearing directly upon the pivot-pin there is an extended bearing-surface throughout the entire width of the chain, the several elements of each link being rigidly connected to one of the bearing-plates, and as each bearing-plate is of the full width of the chain there is no cutting or uneven wearing of the bearing-surface.

The connections being made in the form of two segmental plates, the slots can be readily punched in the link elements and accuracy of fit assured, while there is an extended bearing of one element upon another, so that the chain is not liable to wear unevenly.

While my invention is particularly adapted for use in connection with chains in which the links have teeth $a$ and $b$, it will be understood that in some instances the chain may be a plain drive-chain without teeth.

I claim—

1. The combination of two links, with two bearing-plates coupling the links, said bearing-plates being in the form of segments of a cylindrical shell, substantially as described.

2. The combination of two links, with two segmental bearing-plates coupling the links, the concaved surface of one plate arranged to slide upon the convex surface of the other plate, substantially as described.

3. The combination in a chain of two sets of link elements, with two bearing-plates, one plate carried by one link and the other plate carried by the other link, each plate being in the form of a segment of a cylindrical shell, substantially as described.

4. The combination in a chain of two sets of link elements, the links of one set having segmental slots therein, the slot of each link element being stepped at the ends, with segmental bearing-plates, the convex portion of one plate snugly fitting and arranged to slide upon the concaved portion of the other plate, one plate being attached to one set of link elements and free to move in the other set of link elements, while the other plate is attached to the opposite set of link elements and free to move in the other set, substantially as described.

In testimony whereof I have signed my name to this specification in the presence of two subscribing witnesses.

GLENN G. HOWE.

Witnesses:
  WILL. A. BARR,
  JOS. H. KLEIN.